(12) United States Patent
Roberge et al.

(10) Patent No.: US 9,023,296 B2
(45) Date of Patent: May 5, 2015

(54) METHOD OF MANUFACTURING A REACTOR AND SET OF REACTORS

(75) Inventors: Dominique Roberge, Sierre (CH); Norbert Kockmann, Visp (CH); Michael Gottsponer, Visperterminen (CH); Markus Eyholzer, Brig-Glis (CH)

(73) Assignee: Lonza AG, Basel (CH)

( * ) Notice: Subject to any disclaimer, the term of this patent is extended or adjusted under 35 U.S.C. 154(b) by 401 days.

(21) Appl. No.: 12/743,760

(22) PCT Filed: May 12, 2010

(86) PCT No.: PCT/EP2010/056597
§ 371 (c)(1),
(2), (4) Date: Dec. 29, 2010

(87) PCT Pub. No.: WO2010/130811
PCT Pub. Date: Nov. 18, 2010

(65) Prior Publication Data
US 2012/0045376 A1    Feb. 23, 2012

(30) Foreign Application Priority Data
May 12, 2009 (WO) ................ PCT/EP2009/055740

(51) Int. Cl.
*B01J 10/00* (2006.01)
*B01J 19/00* (2006.01)

(52) U.S. Cl.
CPC .... *B01J 19/0093* (2013.01); *B01J 2219/00015* (2013.01); *B01J 2219/00783* (2013.01); *B01J 2219/00804* (2013.01); *B01J 2219/0086* (2013.01); *B01J 2219/00889* (2013.01); *B01J 2219/00995* (2013.01)

(58) Field of Classification Search
CPC .................................... B01J 19/0093
USPC .............................. 422/603, 502
See application file for complete search history.

(56) References Cited

U.S. PATENT DOCUMENTS

| | | | |
|---|---|---|---|
| 4,894,709 A * | 1/1990 | Phillips et al. | ................ 257/714 |
| 6,369,893 B1 | 4/2002 | Christel et al. | |
| 2003/0150806 A1 | 8/2003 | Hobbs et al. | |
| 2003/0159530 A1 | 8/2003 | Haas et al. | |
| 2004/0005723 A1 * | 1/2004 | Empedocles et al. | ............. 438/1 |
| 2004/0156762 A1 | 8/2004 | Schuppich et al. | |
| 2005/0207953 A1 | 9/2005 | Upadhye et al. | |
| 2006/0171864 A1 * | 8/2006 | Caze et al. | ..................... 422/130 |

FOREIGN PATENT DOCUMENTS

| | | |
|---|---|---|
| EP | 1123735 | 8/2001 |
| EP | 1336432 A2 | 8/2003 |
| EP | 1839739 A1 | 10/2007 |
| EP | 2223741 | 9/2010 |
| WO | WO0141916 | 6/2001 |
| WO | WO0189681 | 11/2001 |
| WO | WO0218042 | 3/2002 |
| WO | WO02064247 | 8/2002 |
| WO | WO 03/043730 A1 | 5/2003 |
| WO | WO2004103539 | 12/2004 |
| WO | WO2007050013 | 5/2007 |
| WO | WO2007112945 | 10/2007 |

* cited by examiner

*Primary Examiner* — Natalia Levkovich
(74) *Attorney, Agent, or Firm* — Hoffmann & Baron, LLP (57) ABSTRACT

A method of manufacturing a target reactor having a flow-channel system in which a plurality of reactants continuously flowing into said target reactor are mixed and interconvert to form a target volumetric flow-rate ($f_2$) of a product continuously flowing out of said target reactor, wherein the smallest hydraulic diameter ($d_{h2}$) of said target reactor is calculated based on the relationship $$d_{h2} = d_{h1}\left(\frac{f_2}{f_1}\right)^{\frac{3-n}{7-n}}$$

in a turbulent or transitional turbulent flow, wherein n is a non-integer number with $1 > n \geq 0$, between the corresponding smallest hydraulic diameter ($d_{h1}$) of a standard reactor having the same fluidic type of flow-channel system, $f_1$ is a standard volumetric flow-rate of said standard reactor carrying out the same interconversion, and $f_2$ is said target volumetric flow-rate.

5 Claims, 8 Drawing Sheets

METHOD OF MANUFACTURING A REACTOR AND SET OF REACTORS

This application is the U.S. National Phase of, and Applicants claim priority from, International Patent Application Number PCT/EP2010/056597 filed 12 May 2010 and International Patent Application No. PCT/EP2009/055740 filed 12 May 2009 which are incorporated herein by reference in their entirety.

BACKGROUND OF THE INVENTION

The present invention refers to a method of manufacturing a reactor, in particular a micro-reactor as disclosed in EP 1 839 739 A1, and a set of reactors.

PRIOR ART

As an example of a reactor, a micro-reactor is described in EP 1 839 739 A1. A reactor is a reaction device provided for the reaction of one or more reactants or educts (typically including mixing of two or more reactants) and to some extent for controlling the reaction of said reactants via heating or cooling or thermal buffering said reactants before, during and/or after mixing. Other micro-reactors for performing chemical reactions within small areas are known from EP-A-0688242, EP-A-1031375, WO-A-2004/045761 and US-A-2004/0109798, for example.

Chemical reactions to be performed in reactors can be classified in various types of reactions. A reactor to be manufactured following the method according to the present invention is preferably designed for carrying out so-called type B reactions. Type B reactions, as for example Wittig reactions or acetoacylation of an aromatic amine with diktene, are rapid and temperature sensitive reactions with typical reaction times in the range of 1 s to 10 min. Important for type B reactions is the reaction temperature or temperature regime. Thus the volumes of mixing and residence zones must be adapted to the flow speed such that the process reactants remain within the micro-reactor for a well-defined time under well-defined conditions, i.e. temperature regimes.

In developing a suitable reactor such as a micro-reactor, firstly, the chemical reactions to take place therein, the desired volumetric flow-rate, i.e. its output (per unit time), and—possibly as a consequence of these factors—the exact type and principle design of the reactor, and the like have to be determined. In case no reactor is available that meets all the demands, it can (has to be) custom tailored. In case all demands are met by a reactor already in use except desired target volumetric flow-rate there are at least three options to achieve the desired target volumetric flow-rate (it should be noted that, without loss of generality, it is referred herein, where appropriate, to an increase of the volumetric flow-rate by means of the target reactor, also called "scale-up", although the inventive method, as a matter of course, is also applicable to a decrease of the volumetric flow-rate, called "scale-down").

(1) The mix of reactants can be enlarged. This procedure, however, is disadvantageous regarding, for example, mixing behaviour, heat development, sedimentation phenomena, emulsification etc. (2) The number of reactors can be increased, so-called numbering-up or parallelization. Parallelization, however, due to the stoichiometry that never is exactly equal in all coupled reactors, unfavourably requires enhanced control of the reaction parameters of each of the individual micro-reactors forming physically separate "reaction channels". Furthermore, the cleaning work is more extensive, and the timing for cleaning each of the individual reactors, is the more sophisticated the more reactors are involved. (3) The reactor used can be sized-up. This, however, can not be done just like that by "stretching" the reactor (i.e. its flow channel system), since, due to chaotic conditions, especially in the so called mixing zone, this would result in a change of fluid dynamics and, therefore, a change of reaction conditions. For the term "size-up" of a reactor with the intention to enhance its possible volumetric flow-rate and, therefore, its productivity (engineered solution instead of adapting chemical and physical reaction parameters), the above mentioned term "scale-up" is preferably used herein.

DISCLOSURE OF THE PRESENT INVENTION

An object of the present invention is to provide a method of manufacturing a target reactor, especially a micro-reactor, achieving a target volumetric flow-rate of a desired product by a chemical reaction running within the target reactor of a plurality of reactants or educts flowing into the target reactor, starting from a standard reactor designed to produce the same product but with a volumetric flow-rate differing from the target volumetric flow-rate.

The above object is solved by a method according to the features of claim 1. Advantageous modifications thereof are defined in the dependent claims. Claim 5 relates to a set of a standard reactor and a target reactor, the target reactor having been manufactured following the method of claim 1.

According to the present invention (claim 1), in a method of manufacturing a target reactor having a flow-channel system in which a plurality of reactants continuously flowing into the target reactor are mixed and interconvert to form a target volumetric flow-rate $f_2$ of a product continuously flowing out of the target reactor, the smallest hydraulic diameter $dh_2$ of the target reactor is calculated based on the relationship $$d_{h2} = d_{h1} \left( \frac{f_2}{f_1} \right)^{\frac{3-n}{7-n}} \tag{1}$$

In a turbulent or transitional turbulent flow, wherein n is a non-integer number with $1 > n \geq 0$, between the corresponding smallest hydraulic diameter $dh_1$ of a standard reactor having the fluidic same type of flow-channel system, $f_1$ is a standard volumetric flow-rate of the standard reactor carrying out the same interconversion, and $f_2$ is the target volumetric flow-rate. Said smallest hydraulic diameter is located in the zone where the plurality of reactants are mixed (hereafter called "mixing zone").

In a modular reactor comprising a plurality of process plates coupled in series, the "flow-channel system" is, as a matter of course, the sum of the "sub-flow-channel systems" of each of the individual process plates that are interconnected with suitable joints as described below, and the first and the last of these sub-flow-channel systems is connected via appropriate joints with one or more pumps and a reception vessel, respectively.

The "fluidic type" mentioned above may thus be characterized by or may combine the following features: (1) the flow-channel system mainly extends in two dimensions; (2) the flow-channel system comprises: (a) supply channels, at least one for each of the plurality of reactants, that merge the plurality of reactants for reaction, (b) meandered flow-channels, (c) at least one discharge channel for discharging the product to be product to be produced, and (d) joints (ports) for internal and external connection, viz. inlet ports between pumps and the plurality of supply channels of the micro-reactor, connection ports between pairs of a plurality of process plates in case there are more than one process plate, and outlet ports between the at least one discharge channel of the micro-reactor and a product collecting device, e.g. a vessel or an after reaction retention volume; and (3) shape and size of the meandered structure is such that the meandered flow-channels comprises at least two zone-types, at least one turbulent-flow mixing zone, where chemical reactions and swirling between the plurality of reactants mainly take place (the Reynolds number is here in a range between 200-2000) in a turbulent-flow regime and where the smallest hydraulic diameter is defined (which in turn may be regarded as a characteristic of the mixing zone), and at least one essentially laminar-flow retention zone, characterized by width, height, and length, whose main task is not mixing (pressure drop) but heat exchange in a laminar-flow regime. As a marginal note, it should be recognized that mixing also occurs in the retention zone, although to a much lesser degree. The mixing effect observable in the retention zone is also called second mixing. Finally, mixing is induced by vortices generated in curves and at edges, which travel along the channel. It should be clearly noted that the scale-up criteria for the turbulent-flow mixing zone and the laminar-flow retention zone in view of their respective tasks are different.

Thus, under turbulent conditions, the "scale-up criteria for mixing" is the energy input per unit volume. At higher flow-rates, the calculated hydraulic diameter with respect to this energy input is represented by equation (1). Increased energy dissipation is obtained by higher pressure drop. The dominant factor for pressure drop is caused from the mixing zone and this is the main zone that must be addressed when operating a micro-reactor at high flow-rates. For example, going from a flow-rate of 100 mL/min to 200 mL/min, the hydraulic diameter of the mixing zone should be increased by a factor of about 1.34. The situation is different in the residence zone. Here, it is possible to maintain the same geometry of the plates (width×height) but increasing, as evident for the skilled person, the length. As mentioned above, the main task of the residence zone is not mixing but heat exchange. Thus, the scale-up criteria for the residence zone is not the hydraulic diameter but to keep the channel geometry constant (as long as possible). However, under some circumstances at high volumetric flow-rates, it may be worth to increase the channel height but to maintain the same channel width for example from 0.5×5 mm² to 0.5×8 mm² or 0.5×10 mm². As heat exchange is critical, the channel width is in that zone the critical scale-up factor and it is kept constant from a small plate to a large plate.

The idea of the present invention is, therefore, that a target reactor is manufactured based on a physical quantity of a standard reactor as mentioned above and a target volumetric flow-rate that the target reactor shall desirably have. As stated above, it is—without loss of generality—herein referred to the case where the target reactor results from a scale-up of the standard reactor where appropriate, i.e. the case $f_2 > f_1$, the inventive principle, as a matter of course, being equally applicable to the case $f_1 > f_2$ (scale-down). The idea of the present invention is, alternatively formulated, to avoid parallelization of a plurality of reactors when the volumetric flow-rate is to be increased from $f_1$ of an available or known reactor to $f_2$ of the target reactor. As insinuated above, it is the pressure drop, given by the flow-rate and the geometry of the mixing zone, between the entrance and the exit of the mixing zone rather than the absolute value of the inlet pressure, provided by means of the pumps promoting the flow of reactants, that is the decisive physical quantity determining the mixing efficacy between them. In fact, it is this pressure drop, comparable—physically as well as regards terminology—to the voltage drop at a resistor in electronics, that is a measure for the energy transferred to the system, here the fluid of reactants and, therefore, for the mixing efficacy. To be specific, the energy transfer into the mixture of reactants according to the present invention is in the order of 70%, whereas a corresponding value for the retention zone is about 25% or less. The remaining portion of energy is transferred to the joints (fittings). Advantageously, the pressure drop can be easily measured within the essential zones along the flow, i.e. the mixing zone(s).

Furthermore, except for the above described flow-channel system, according to the present invention, the standard reactor is not restricted; it may me a modular or a non-modular type of reactor. In case of a modular reactor, said flow-channel system may be formed of plate-shaped process modules in a micro-reactor disclosed in EP 1 839 739 A1.

Hereafter, a short derivation of equation (1) is given.

In long straight channel zones, wherein the flow is almost entirely laminar (i.e. retention zones), and short channel zones (i.e. mixing zones), wherein the flow is close to entirely turbulent, the pressure loss within the flow system can be represented by Bernoulli's equation comprising terms for kinetic energy and neglecting potential energy. Regarding terminology, it should be noted that a channel herein is divided into mixing zones and laminar zones, intermittently arranged and having an individual length $L_i$, where each mixing zone is a concatenation of mixing elements (the locations of vortice) like pearls on a rope. The important effective hydraulic diameters $d_h$ are located in the parts of the channel within the mixing elements, below abbreviated as "channel within the mixing element". Since the hydraulic diameters $d_{h,i}$ are responsible for the generation of mixing and swirling and the energy loss associated thereby, an approximation is made in a sense that the laminar zones are neglected.

The total pressure loss of N mixing elements with individual length $L_i$ and individual hydraulic diameter $d_{h,i}$ is given by:

$$\Delta p = \sum \left( \frac{C_{fl}}{Re_i^n} \cdot \frac{L_i}{d_{h,i}} \cdot \frac{\rho}{2} w_i^2 \right) \qquad (2)$$

where $w_i$ is a characteristic fluid velocity within the i$^{th}$ mixing element, $C_f$ is a friction coefficient, and Re is the Reynolds number with an exponent n.

Each mixing element can be characterized by its characteristic hydraulic diameter $d_h$ and its length L. We found that the ratio of both length scales should be kept constant during scale up or scale down to achieve similar flow conditions and similar energy input into the flow system, which results in similar mixing efficiency in a similar mixing time. For a channel within a mixing zone, the pressure loss can be expressed by the following equation:

$$\Delta p = N_i \frac{C_{fl}}{Re_i^n} \cdot \frac{L_i}{d_{h,i}} \cdot \frac{\rho}{2} w_i^2 \qquad (3)$$

The exponent n of the Reynolds number Re in the denominator depends on the flow regime in the channel in the mixing zone. For fully laminar flow or fully turbulent flow, n is 1 and 0, respectively. In complex mixing elements often a transition flow between straight laminar and fully turbulent flow is dominant, leading to a non-integer number of n, having a value between 0 and 1. Especially in the region near 0 (predominantly turbulent or almost fully turbulent), the tolerance for deviations is higher than in the region near 1 (predominantly laminar). For a flow regime of Re between 100 and 1000 in a T-shaped mixing zone, we found the exponent to be about ⅓.

Combining equations 2 and 3, and using the approximation $f \cong d_h^2 w$ (hydraulic diameter in [m]×mean fluid velocity in [ms$^{-1}$]) in [m$^3$ s$^{-1}$] and consequences thereof such as $d_h = (f/w)^{1/2}$ and $Re = d_h w/\nu = f/\nu d_h$ with equation 3, the hydraulic diameter $d_h$ becomes:

$$d_h = \left(\frac{N_i L_i C_f}{2\Delta p} \rho \nu^n f^{2-n}\right)^{\frac{1}{5-n}} \tag{4}$$

where $\nu$ means the kinematic viscosity [m$^2$ s$^{-3}$], f means the volumetric flow rate [m$^3$ s$^{-1}$], and $\rho$ means the density [kgm$^{-3}$].

The inventors of the present invention found that mixing efficiency strongly depends on the local energy dissipation rate, i.e. the loss of pressure energy which is converted during the mixing of at least two flows, and the geometry of the channel. The channel guides the flow and causes flow deflections. Besides shear forces, new flow-perpendicular forces act on the fluid and generate secondary flow structures, vortices, and recirculation zones. For the avoidance of doubt, the primary flow structures are the hard coded flow structures worked out of the reactor material in the micro channels. A rapid change of such secondary flow vortices by alternating mixing elements or by repeatedly deflected flow leads to efficient flow mixing. To generate these secondary flow structures and vortices, the fluid needs mechanical energy consumed from the pressure of the fluid. Hence, we use the pressure drop per unit volume as a measure for mixing, expressed in the energy dissipation rate $\epsilon$:

$$\varepsilon = \frac{\Delta p f}{m} = \frac{\Delta p w}{\Delta L \rho} \tag{5}$$

Using the approximation that the effective channel length $\Delta L$, over which the pressure loss occurs, is equal to the length of the sum of all mixing elements, we define $\Delta L$ as $\Delta L = N_i L_i$. The more energy is dissipated in a mixing channel, the shorter is the mixing time due to smaller secondary fluid structures (i.e. vortices and recirculation zones), where diffusion of the species occurs as last measure of mixing. The species diffusion, i.e. the mixing time $t_m$ [s] can be represented by the Schmidt number Sc, the ratio of the kinematic viscosity $\nu$ [m$^2$ s$^{-3}$] to the diffusivity of the main species:

$$t_m = C_m \cdot Sc \cdot \left(\frac{\nu}{\varepsilon}\right)^{\frac{1}{2}} \tag{6}$$

The mixing coefficient $C_m$ was given by Bourne [J. R. Bourne, Org. Process Res. Dev. 7, 2003, 471-508] as engulfment rate of 17.3. The hydraulic diameter can now be correlated to the volumetric flow rate and the typical mixing time:

$$d_h = \left(\frac{t_m}{C_m Sc}\right)^{\frac{2}{7-n}} \left(\frac{C_f}{2L_i} \nu^{n-1} f^{3-n}\right)^{\frac{1}{7-n}} \tag{7}$$

For most industrial applications for micro-reactors typical pressure losses of 1.0, 5.0, and 20 bar and mixing times of 0.1, 0.01, and 0.001 seconds display an appropriate range.

Suitable values of the exponent n in micro-reactors for industrial applications range from 0 (fully turbulent flow) over about ¼ (transitional and low turbulent flow) to about ⅓ (laminar vortex flow). An entirely laminar flow having an exponent n of 1 is not considered here due to minor mixing efficiency.

Using the correlation of the hydraulic diameter and pressure drop of:

$$\Delta p = \left(\frac{i L_i C_f}{2} \rho \nu^n\right) \frac{f^{2-n}}{d_h^{5-n}} \tag{10}$$

the pumping power required to compensate the pressure drop can be expressed as:

$$P_p = f \Delta p = \left(\frac{i L_i C_f}{2} \rho \nu^n\right) \frac{f^{3-n}}{d_h^{5-n}} \tag{11}$$

Thus, to obtain a similar mixing time, the ratio of diameter to volumetric flow rate should follow equation 1 as expressed above.

$$d_{h,2} = d_{h,1} \left(\frac{f_2}{f_1}\right)^{\frac{3-n}{7-n}} \tag{1}$$

Examples for $$\left(\frac{3-n}{7-n}\right)$$

exponents in suitable flow regimes (turbulent flow (n=0) and transitional turbulent flows (n=¼ and ⅓, respectively)) are 3/7=0.4286 (optimal), and 11/27=0.4074 and 2/5=0.4 (both yield still acceptable physical parameters), respectively. Compared to that, the exponent at an entirely laminar flow regime (n=1, i.e. inefficient mixing in micro-reactors) is 2/6=0.3333. Thus, to achieve acceptable and comparable mixing times and efficiency expressed in terms of acceptable pressure drop (i.e. require pumping power) and energy dissipation (i.e. energy input into the flows) the exponent should be in a narrow range of 0.4286 and 0.4.

Consequences for optimal required hydraulic diameter at a 10-fold flow increase at suitable turbulent/transition flow ratios for examples ¼ and ⅓ compared to a non-suitable ratio of 1 demonstrate dramatic changes when leaving the preferred n-ranges. According to equation 1, a 10-fold flow increase at turbulent to transition flow regions ¼ (75%) and ⅓ (approx. 66%) results in a 5.0% and 6.8% smaller optimal hydraulic diameter, respectively. This deviation can be neglected. In contrast to that a 10-fold flow increase at a 50% turbulent to transition flow ratio results in a 24.5% smaller optimal hydraulic diameter.

Consequences for required pumping power when leaving the preferred ranges of n are also dramatic. For a 10-fold increased flow rate an approx. 7% smaller hydraulic diameter requires nearly doubled pumping power to achieve similar mixing times in the turbulent flow region. A 33% smaller hydraulic diameter requires nearly 10-fold pumping power. 10-fold increase of flow rate at a 22% too large diameter compared to value from equation 1 for turbulent flows corresponds to a 2-fold longer mixing time.

Thus, a too small diameter requires a too large pumping power and a too large diameter results in too slow mixing.

Channel geometry, flow regime (determined by the Reynolds number, the ratio between (flow rate×hydraulic diameter) and the kinematic viscosity, which should be larger than 100, preferably larger than 300) and pressure drop. The hydraulic or equivalent spherical diameter $d_h$ of a flow channel is generally defined as $d_h=4 A/U$, where A is the cross-sectional area and U is the wetted perimeter of the cross-section of the flow channel The bridge to the above mentioned Reynolds number $R_e$ can be built by noting that in its definition, which is $R_e=\rho f d_h/\mu$, $d_h$ is said hydraulic diameter. The other quantities are the density $\rho$ of the fluid, the flow-rate f, and the dynamic viscosity $\mu$. It should be noted that equation (1) is valid only for turbulent flow, a constraint that is given in the for scale-up significant mixing zones of the micro-reactor disclosed in EP 1 839 739 and its modification.

Although the principle design is left unchanged between the standard reactor and the target reactor, there are several physical variables that the skilled person knows may be appropriately adapted to a change of the volumetric flow-rate from that of the standard reactor to that of the target reactor. Most favorably for scale-up from a given size to the next larger size according to the present invention, which is, for example, from a DIN A5 area equivalent process plate to a DIN A4 area equivalent process plate, there is a change of pressure drop at the mixing zone by a factor in the range of ⅓ to ⅕, while the width and height of the mixing zone increases each time by a factor from 1.3 to 1.4. Generally, there is a minimum residence time that shall not be undercut in the scale-up process. Further variables are the number of "windings" of the meandered structure, the "amplitude" of these windings as well as their width and height, the volume of the retention zone, that has, for example, to be enlarged as a consequence of an increase in the volumetric flow-rate. As for the change of the retention zone, it should be noted that the decrease of the pressure drop is not a linear function of the enlargement of the retention zone, because there is a contribution to the pressure drop also from the inlet ports.

According to a preferred aspect of the present invention, the target reactor is a micro-reactor. It should be noted that the micro-reactor here comprises at least one mixing zone having a plurality of mixing elements, as stated above, wherein there is an equal loss of energy during the passage of the mixture of reactants within each mixing element.

According to a second aspect of the present invention, there is defined a set of a standard reactor and a target reactor which can be manufactured based on the standard reactor, and the method described above maintaining the chemical reaction behavior of the standard reactor.

It should be noted that the method and the reactor manufactured according to the present invention are preferably but not exclusively for use during clinical phases I-III in medical development, where, from phase I to phase III, the number of persons required in the test and, therewith, the quantity of medical substances to be tested increases.

BRIEF DESCRIPTION OF THE DRAWINGS

Further objects, advantages and features may be derived from the depending claims and the described embodiments of the present invention. Thereto:

DETAILED DESCRIPTION OF THE INVENTION

In the following, a method according to the present invention will be described with reference to a micro-reactor as disclosed in EP 1 839 739 A1 of the same applicant, as an example for a standard reactor. Of course, the method according to the present invention may be applied to any other reactor whose fluid dynamics can be determined by the same parameters as that of the above cited micro-reactor.

Generally, the standard reactor may be any already available reactor that produces the desired product said reactor comprising at least one turbulent-flow regime and at least one laminar-flow regime, but has a different, that is larger or smaller, volumetric flow-rate of the desired product. Alternatively, the standard reactor may be the result of a target-oriented process of development to produce the desired product, which process of development may constitute an initial step of the method according to the present invention. Such a target-oriented process of development may start from the initial objective to produce the desired product and, therefore, may include typical engineering processes of designing and constructing a suitable (standard) reactor through various stages from an initial reactor prototype to a final reactor prototype that is able to produce a product having the desired quality and chemical characteristic features. In other words, a main aspect of such a target-oriented process is to arrive at a reactor prototype that enables to produce the desired chemical product rather than to produce a specific target volumetric flow-rate of the product, and that can be used as a standard reactor.

According to the present invention, a target reactor achieving a desired target volumetric flow-rate of a desired product is manufactured using a standard reactor comprising at least one turbulent-flow regime and at least one laminar-flow regime as an example that is able to produce any amount of the desired product. In other words, the method according to the present invention starts from an appropriate standard reactor that is able to produce the desired product of the same quality and the same chemical characteristic features but with a volumetric flow-rate that does not match the desired target volumetric flow-rate.

Figure 1:
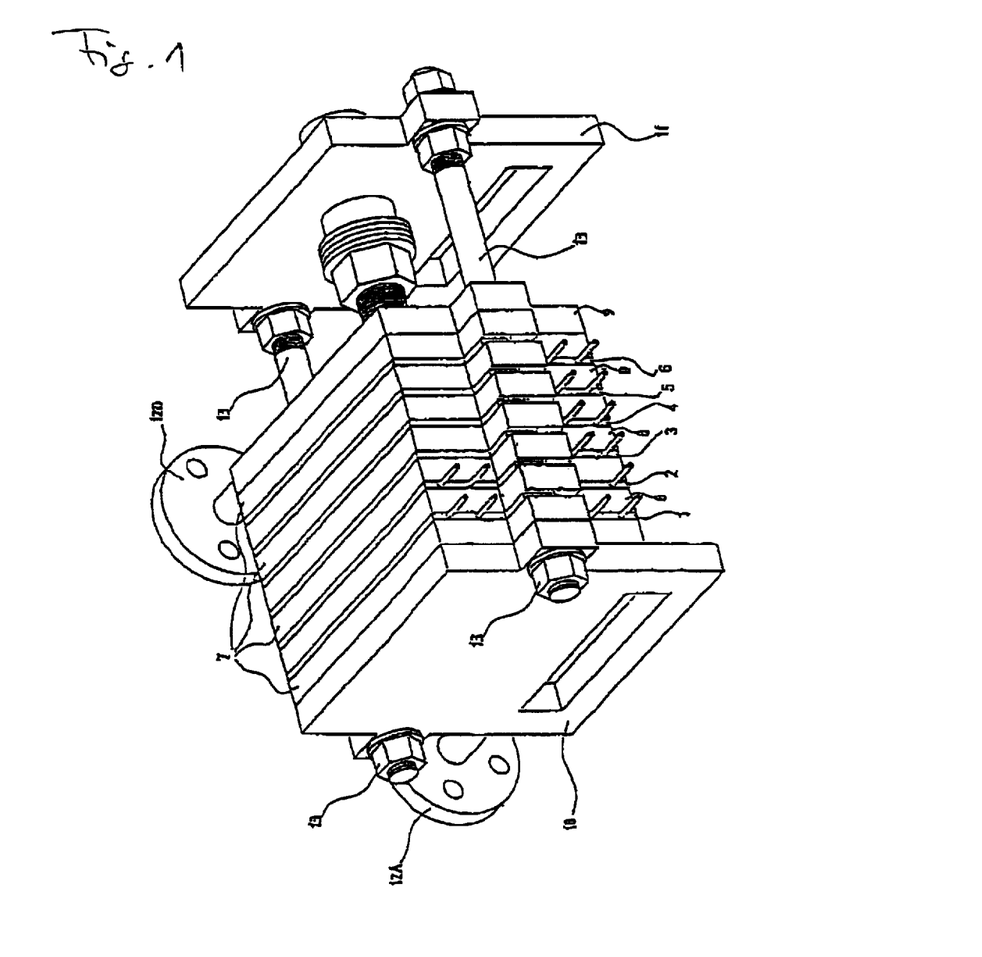
FIG. 1 shows a spatial view of a known micro-reactor system assembly.
Figure 2:
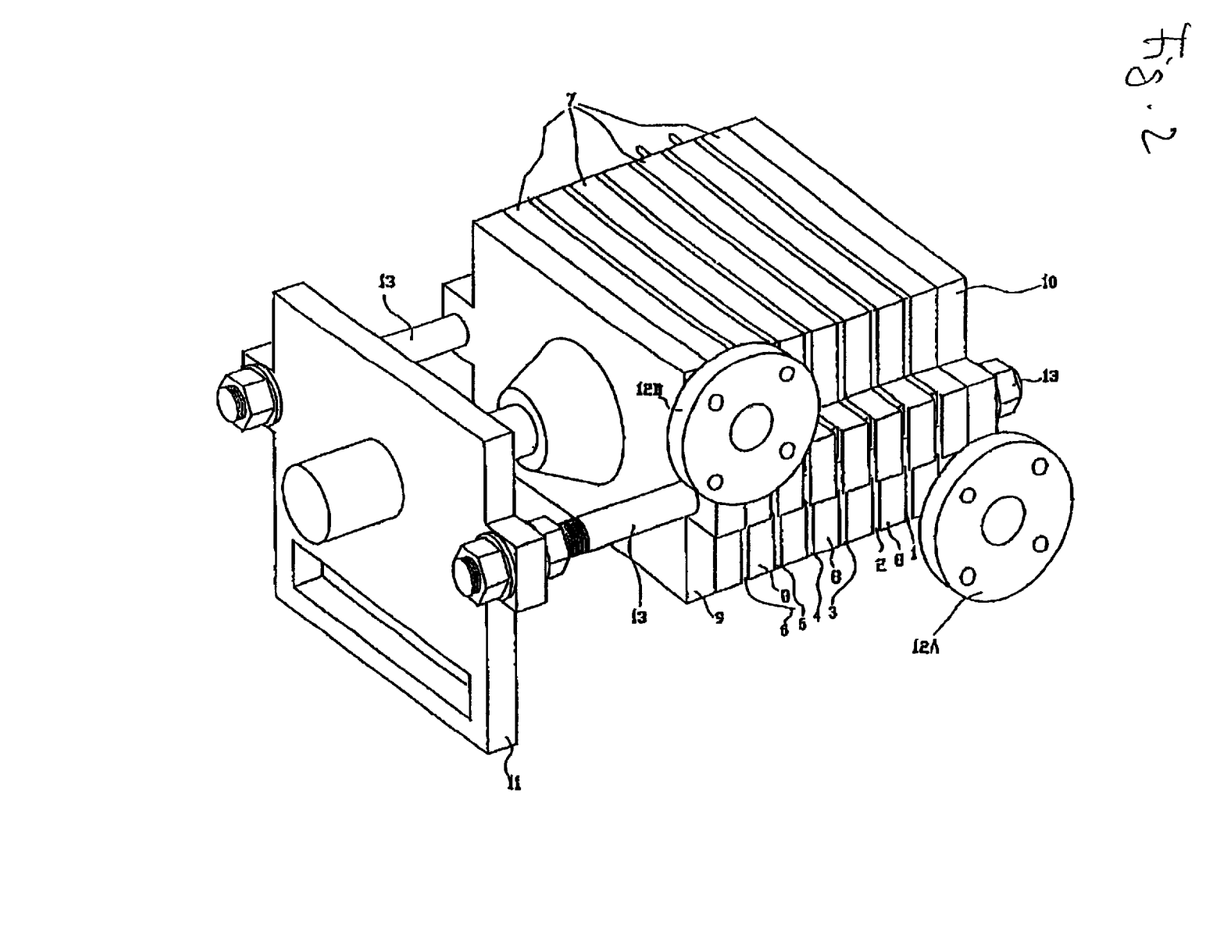
FIG. 2 shows a spatial view rotated 180° of the micro-reactor system assembly shown in FIG. 1.
Figure 3:
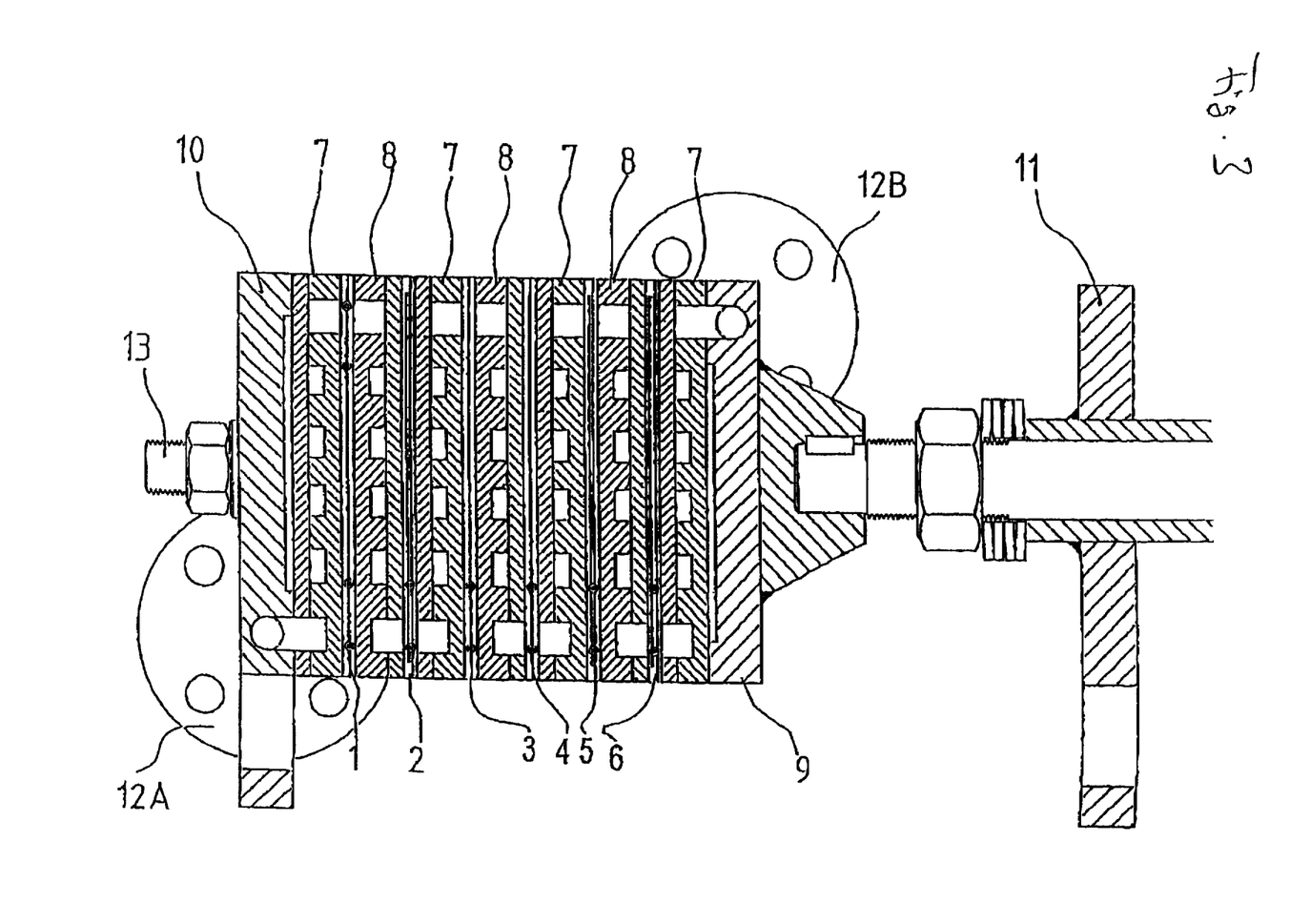
FIG. 3 shows a longitudinal section of a micro-reactor system shown in FIG. 1.
Figure 4:
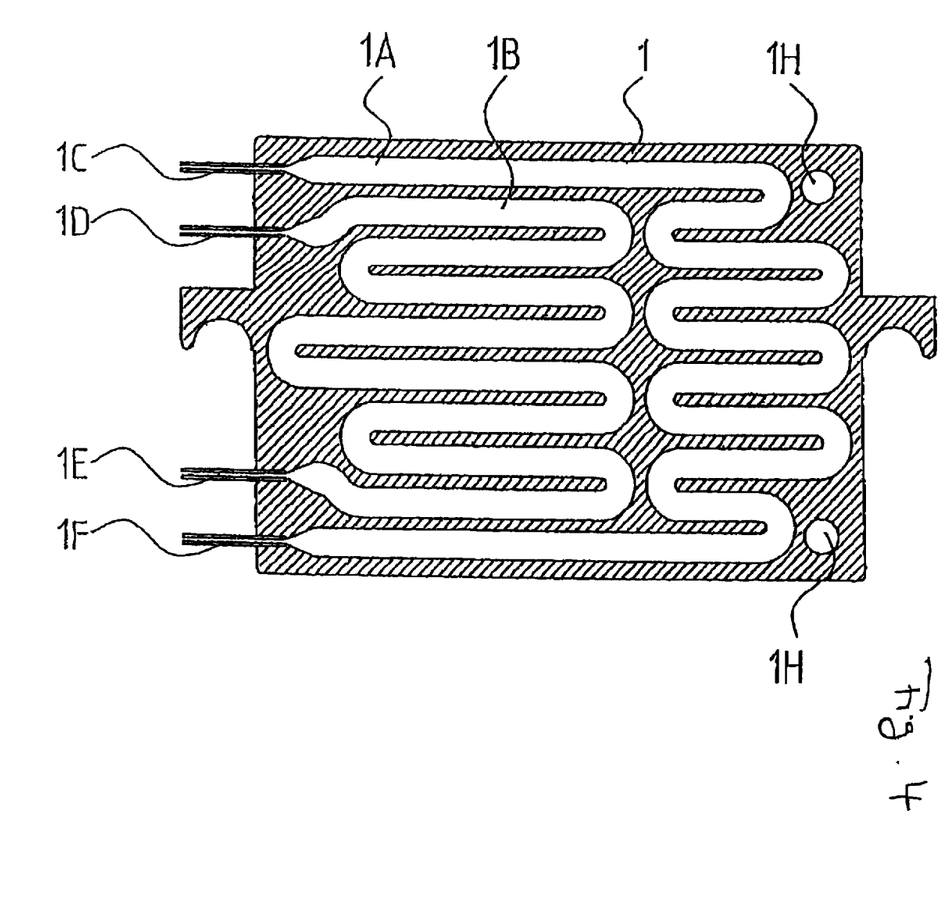
FIG. 4 shows a frontal sectional view of a thermal adjusting module of the micro-reactor system assembly shown in FIG. 1.

An example of a standard reactor developed by the applicant of the present invention for chemical reactions of the type B is a micro-reactor as it is disclosed in EP 1 839 739 A1. FIGS. 1 to 3 which correspond to FIGS. 1, 2, and 17 of EP 1 839 739 A1 show the overall modular construction of this known micro-reactor. FIGS. 4 to 7, which correspond to FIGS. 3 to 6 of EP 1 839 739 A1, show a temperature adjusting module 1 and a mixing module 2 as examples of various process modules of this known micro-reactor.

The micro-reactor as shown in FIGS. 1, 2, and 3 comprises a first frame means 10, a first heat exchange module 7, a thermal adjusting module 1 as a process module, a second heat exchange module 8, a mixing module 2 as a further process module, another first heat exchange module 7, a retention module 3 as a further process module, another second heat exchange module 8, further retention modules 4, 5 and 6 respectively, each sandwiched between two heat exchange modules 7, 8 and a second frame means 9 in this sequence. Thus, between said first and second frame means 10, 9 alternating a first or second heat exchange module 7, 8 and a process module 1-6 are provided. As shown in FIGS. 1, 2, two tie-rods 13 push first and second frame means 10, 9 towards each other, thereby pressing the stacked heat exchange modules 7, 8 and process modules 1-6 against one another. Placing tie-rods 13 at the circumference of the micro-reactor system assembly and providing a cavity (see FIG. 3) within the centre of the surfaces of the frame means 10, 9 contacting the heat exchange modules 7, 8, a high pressure can be obtained at the circumference of the micro-reactor system assembly.

Figure 5:
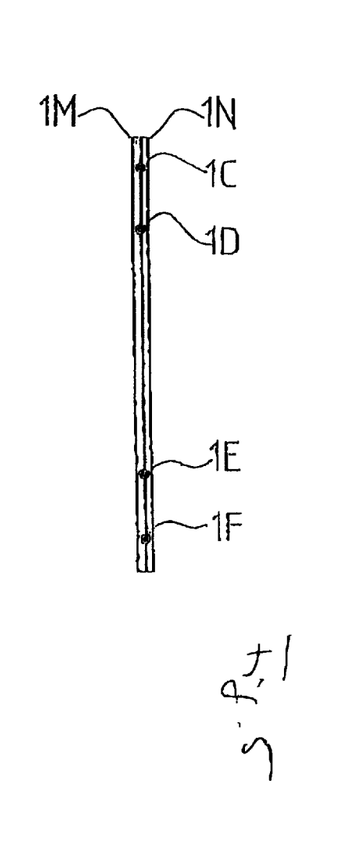
FIG. 5 shows the thermal adjusting module of FIG. 4, seen from the left.
Figure 6:
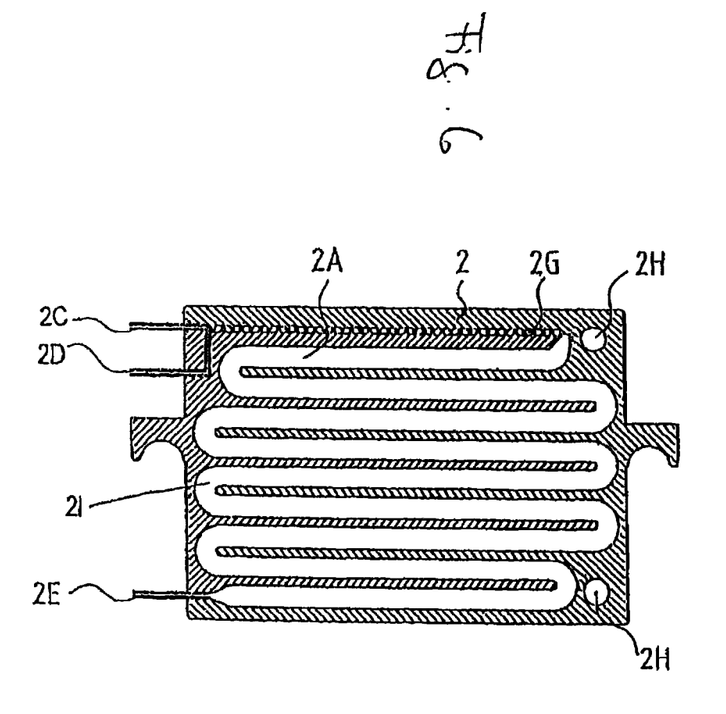
FIG. 6 shows a frontal sectional view of a mixing module of the micro-reactor system assembly shown in FIG. 1.

The temperature adjusting module 1 shown in FIGS. 5 and 6 is provided as a first process module. Said temperature adjusting module 1 comprises a first reactive fluid passage 1A, communicating with a first reactive fluid inlet port 1C and a first reactive fluid outlet port 1F, and a second reactive fluid passage 1B communicating with a second reactive fluid inlet port 1D and a second reactive fluid outlet port 1E. A first reactive fluid is supplied to the first reactive fluid passage 1A through the first reactive fluid inlet port 1C. A second reactive fluid is supplied to the second reactive fluid passage 1B through the second reactive fluid inlet port 1D. Further, said temperature adjusting module 1 comprises a first and second plate 1M, 1N (FIG. 6), which are joined with one another by soldering or the like. Into the contacting surfaces of the first and/or second plate 1M, 1N the sinusoidal reactive fluid passages 1A, 1B are cut by etching, milling or the like. While flowing through said first reactive fluid passage 1A toward said first reactive fluid outlet port 1F, said first reactive fluid's temperature is adjusted by the two heat exchange modules 7, 8 sandwiching said temperature adjusting module 1. Thereto the heat exchange fluid flowing through said heat exchange modules 7, 8 supplies or removes heat to said first reactive fluid by heat conduction through the plates 7N, 8M of the heat exchange modules contacting the plates 1M, 1N of said temperature adjusting module.

Figure 7:
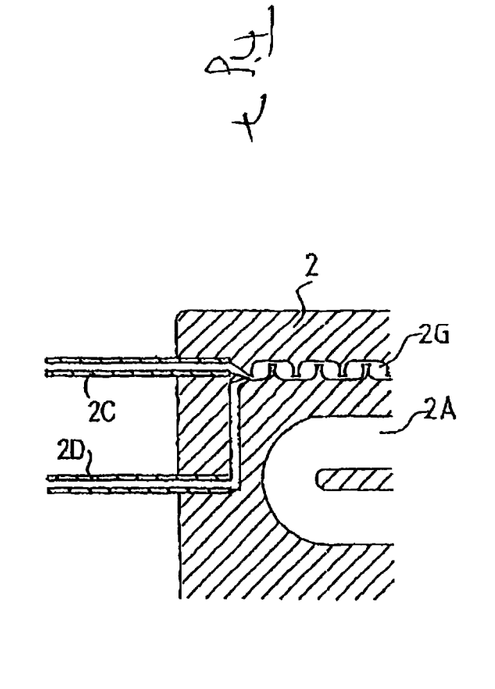
FIG. 7 shows an enlarged view of an upper left corner indicated "X" in FIG. 6.

The mixing module 2 shown in FIGS. 6 and 7 is provided as a second process module. Although not shown in detail, said mixing module 2 comprises a first and second plate similar to the temperature adjusting module 1 described above. In said mixing module a reactive fluid passage 2A is provided comprising a mixing section 2G and a first retention section 2I. A first reactive fluid inlet port 2C communicating with said reactive fluid passage 2A is connected with the first reactive fluid outlet port 1F of the temperature adjusting module 1 by an external connection (not shown). A second reactive fluid inlet port 2D also communicating with the reactive fluid passage 2A, is connected with the second reactive fluid outlet port 1E of the temperature adjusting module 1 similarly. Thus, the first and second reactive fluids respectively, after having passed through said temperature adjusting module 1, flow into the mixing section 2G of the passage 2A within the mixing module 2, wherein said both reactive fluids are mixed with one another. The geometry of the mixing section 2G, as shown in enlarged view in FIG. 7, can be chosen appropriately to mix the reactive fluids in an optimal way. After being mixed, the resulting process fluid flows into the first retention section 2I of the reactive fluid passage 2A which basically is formed as a flat channel, thus providing an substantially laminar flow of the process fluids. During mixing and residence within the mixing section 2G and first retention section 2I, the chemical reaction can be temperature controlled by the two heat exchange modules 8, 7 sandwiching said mixing module 2.

The process fluid, leaving the reactive fluid passage 2A through a reactive fluid outlet port 2E, enters various retention modules 3-6 in which the process fluid is temperature controlled by two heat exchange modules 7, 8 adjacent to each of the retention modules as described for the temperature adjusting module 1 and mixing module 2 before. In this manner the reactive fluid can flow through all subsequent retention modules 4-6 before leaving the micro-reactor system assembly through a last process module's outlet port 6D.

The residence time within each retention module 3-6 is defined by the retention volume, i.e. the section (width× height)×length of the passage 3A-6A accommodating the process fluid, divided by the flow-rate. Thus, by providing different widths, lengths, and/or heights of the single passages, different residence times can be obtained. By combining different retention modules with different passage geometries, therefore the residence time can nearly arbitrarily be chosen.

The reactive fluid passages in the process modules 1-6 are micro-structured by etching, milling or the like. Since the heat exchange modules 7, 8 are manufactured separately, they may be manufactured without the micro-structuring, thus reducing costs. Furthermore, since said heat exchange modules 7, 8 do not come into contact with the reactants, they do not need to be resistant to corrosion or high process pressures, thus allowing the use of materials optimised for heat transfer.

The above described micro-reactor provides due to its modular structure high flexibility and allows combining different mixing channel geometries with different retention modules, thereby providing arbitrarily chosen residence times, in particular for type B reactions. Each of said process modules 1-6 is temperature controlled by two adjacent heat exchange modules 7, 8. Since heat transfer only is realised by heat conduction through the plates 1M-8M, 1N-8N of the heat exchange modules 7, 8 and process modules 1-6 no sealing or the like is necessary. Furthermore, advantageously the process modules 1-6 may be optimised with respect to the reactants accommodated therein, for example being resistant to corrosion and/or pressure, while at the same time the heat exchange modules 7,8 not coming into contact with the reactants, can be optimised with respect to heat transfer and/or sealing characteristics.

For a DIN A5 size micro-reactor, that is a micro-reactor with a surface area of its plates corresponding approximately to DIN A5, with a given flow-rate of for example 100 ml/min, a process module's passage length of about 1844 mm, a passage height of 10 mm and a passage width of 0.5-2 mm residence times of 6-22 sec per module have been realised in an example testing. Thus overall residence times of up to 30 min can be realised. Incidentally, by milling out the existing flow-channel system and changing of the dimensions of the mixing zone, a DIN A4 size micro-reactor can be simulated with the original DIN A5 size micro-reactor, i.e. with an unamended length of the edge.

With respect to other technical details concerning the construction and way of operation of the above described micro-reactor it is referred to EP 1 839 739 A1.

Generally, as stated above, the standard reactor to be used as a starting point for the manufacturing of a target reactor achieving a target volumetric flow-rate of a desired product has a flow-channel system in which a plurality of reactants continuously flowing into the standard reactor are mixed and interconvert to form a volumetric flow-rate $f_1$ of a desired product continuously flowing out of the standard reactor. The (maximum) volumetric flow-rate $f_1$ depends on several flow-related characteristic features of both the flow-channel system (smallest hydraulic diameter, length of the flow-channel system, pressure, temperature regime) and the reactants (viscosity, reactivity). Referring to the micro-reactor as it is disclosed in EP 1 839 739 A1, such a flow-channel system would include, for example, fluid passages 1A and 1B of the temperature adjusting module 1 shown in FIGS. 4 and 5, and fluid passages 2G, 2A, and 2I of the mixing module 2 shown in FIGS. 6 and 7.

Starting from such a standard reactor that is able to produce a product having a desired quality and desired characteristic features but that achieves a volumetric flow-rate $f_1$ which is different from a target volumetric flow-rate $f_2$, a target reactor shall be manufactured that is able to produce the target volumetric flow-rate $f_2$ of the same product. The volumetric flow-rate $f_1$ of the standard reactor can be determined e.g. by way of measurement or calculation. In case the standard reactor is, for example, a modular reactor as it is disclosed in EP 1 839 739 A1, which is formed of a combination of several process modules each containing a sub flow channel system, the method according to the present invention would have to be followed for the complete flow channel system which is a sum of the sub flow channel systems, where there is only one smallest hydraulic diameter in the complete flow channel system.

The method according to the present invention provides that the smallest hydraulic diameter $dh_1$ of the flow-channel system of the standard reactor (smallest standard hydraulic diameter) is determined, e.g. by way of measurement or calculation, and that the corresponding smallest hydraulic diameter $dh_2$ of the target reactor (smallest target hydraulic diameter) is calculated based on a well-defined relationship between the smallest hydraulic diameter $dh_1$ of the standard reactor, the standard volumetric flow-rate $f_1$ of the standard reactor, and the target volumetric flow-rate $f_2$ of the target reactor.

As stated above, according to the present invention, preferably the following equation holds:

$$d_{h2} = d_{h1}\left(\frac{f_2}{f_1}\right)^{\frac{3}{7}} \qquad (1)$$

Having calculated $dh_2$, the remaining design parameters of flow-channel system of the target reactor, such as the length, the shape, etc. can be easily defined and adapted by the competent person skilled in the art according to the respective needs. Having defined and adapted the remaining design parameters of the flow-channel system, the outer dimensions of the target reactor may vary as compared to the standard reactor.

Figure 8:
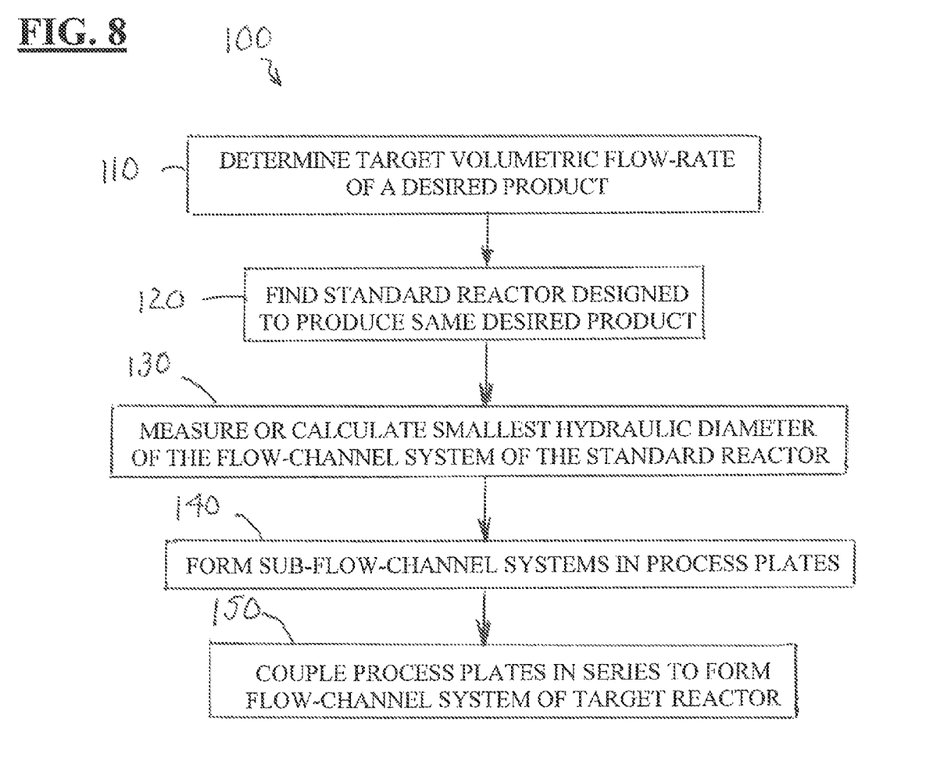
FIG. 8 is a flow chart showing the steps directed to the manufacture of the target reactor based on the comparison with the standard reactor.

FIG. 8 is a flow chart 100 showing the steps directed to the manufacture of the target reactor based on the comparison with the standard reactor. In step 110, an object of the present invention is to provide a method of manufacturing a target reactor, especially a micro-reactor, achieving a target volumetric flow-rate of a desired product by a chemical reaction running within the target reactor of a plurality of reactants or educts flowing into the target reactor. This method includes the step 120 of starting from a standard reactor designed to produce the same product but with a volumetric flow-rate differing from the target volumetric flow-rate. In step 130, the smallest hydraulic diameter of the flow-channel system of the standard reactor is determined. In step 140, sub-flow-channel systems are formed in the process plates and, in step 150, the process plates are couple together in series to form the flow-channel system of the target reactor.

Figure 8A:
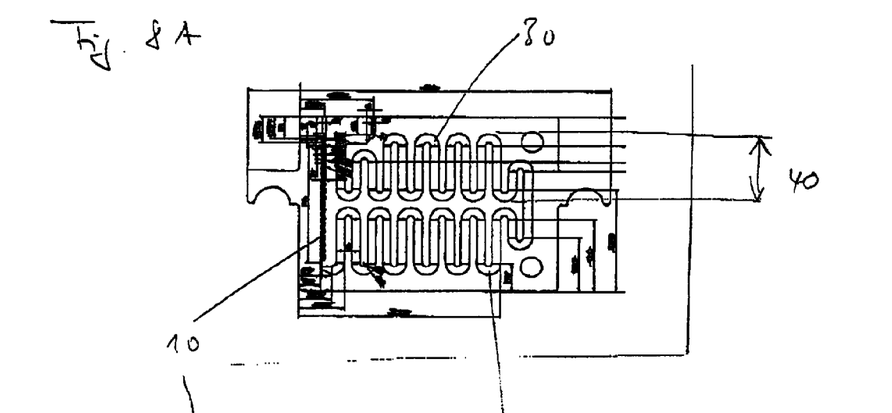
FIGS. 8A and 8B show an example of a process/mixing module of a standard reactor of size 2 (FIG. 8A) and of a scaled-up target reactor of size 3 (FIG. 8B)
Figure 8B:
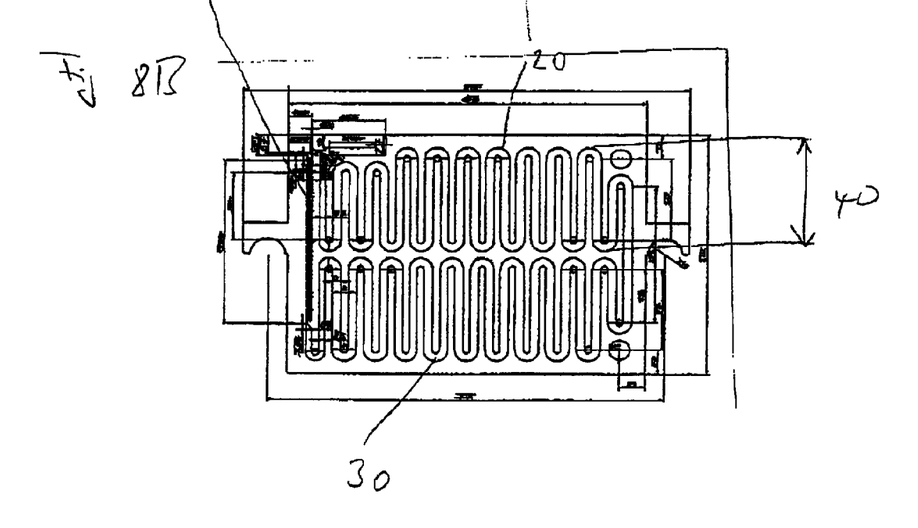

FIGS. 8A and 8B reflect the idea underlying the method according to the present invention. Specifically, FIGS. 8A and 8B, show as examples of plate-shaped process modules of a standard reactor and a target reactor two mixing modules which are of different size (outer dimensions) and which differ from each other basically in the shape, e.g. the course and length, of the corresponding flow-channel systems and their respective scale-up or scale-down. While the mixing module shown in FIG. 8A may be considered to represent a standard reactor, the mixing module shown in FIG. 8B may be considered to represent a target reactor. Despite the differences in the shape of the corresponding flow-channel systems and in the outer dimensions of the plate-shaped process modules, the general principle of construction underlying these process modules is the same. As described above with respect to FIGS. 4 to 6, each of the modules shown in FIGS. 8A and 8B is formed of two plate members having a flow-channel system—or in the terminology above: "sub-flow-channel system"—incorporated therein. FIGS. 8A and 8B reveal that the meandered structures shown extend in the plane of projection which—in case of a modular reactor, for example—may be the plane the corresponding module extends. The mixing modules shown in FIGS. 8A and 8B may be incorporated into a micro-reactor of a structure as it is disclosed in EP 1 839 739 A1 in place of the above described mixing module 1.

FIGS. 8A and 8B show the micro-reactors of size 2 and size 3 respectively, in correct dimensional relationship (however, not to scale which is about DIN 6 DIN 5 equivalent area). Clearly shown in each case are a turbulent-flow mixing zone 10 and a laminar-flow retention zone 20. As can be seen, the principle design of the flow-channel system comprising the turbulent-flow mixing zone 10 and the laminar-flow retention zone 20 is identical, although the number of windings 30 and the size of amplitudes 40 of the meandered structure are different. As for the structural details per se, it is referred to EP 1 839 739 A1.

Figure 9:
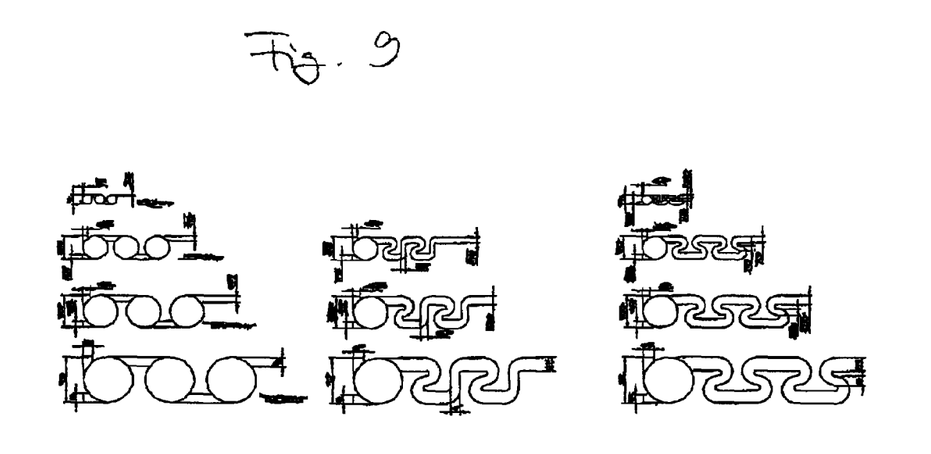
FIG. 9 shows three differently shaped flow-channel portions of process modules of a standard reactor, scaled-down target reactors and a scaled-up target reactor.
Figure 10:
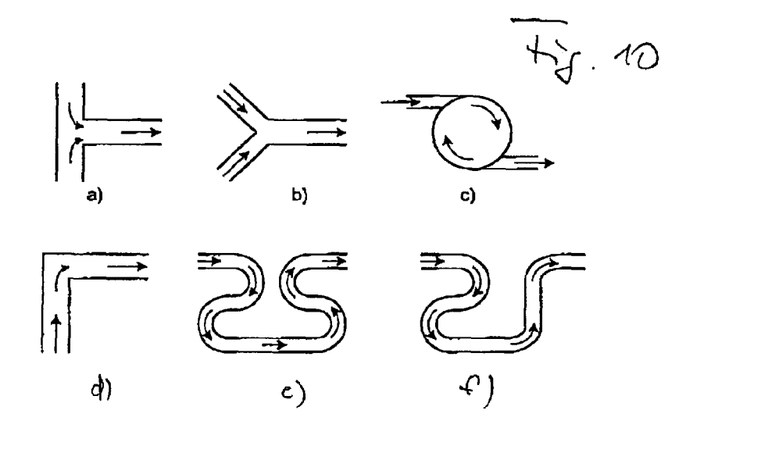
FIG. 10 shows schematically different mixer forms applied in the present invention.

FIG. 9 shows portions of mixing zones of different sub-flow-channel systems, where the circles in each case are cross-sections of turboid mixing units. The examples of the first column comprises only turboid mixing elements, the second column a mixture of turboid and SL-mixing elements, and the last column a mixture of turboid and SZ-mixing elements. The terms "SL" and "SZ" are of phenomenological nature, their respective structure looking similar to the corresponding combination of capital letters. There and other mixer forms are shown in FIG. 10, where Figs. a) to f) are called a T-contacter, an Y-contacter, a tangential mixer, a bend, a SZ mixer and a LZ mixer, respectively. Specifically, FIG. 9 shows example structures of flow-channel portions of process modules of various micro-reactors of size 1, size 2, size 3, and size 4 in the first to fourth row, respectively, with the parameters "mixing width", "mixing height", "residence height", and "residence depth" according to table 1 below, wherein size 3 may be considered to represent a standard reactor, size 1 and size 2 may be considered to represent scaled-down target reactors, and size 4 may be considered to represent a scaled-up target reactor. Accordingly, when size 2 is considered to represent the standard reactor, size 1 may be considered to represent a scaled-down target reactor, and size 3 and size 4 may be considered to represent scaled-up target reactors, and so forth.

TABLE 1

| Flow-Rate [ml/min] | Reactor Size | Mixing Width | Mixing Heights | Residence Width | Residence Heights |
|---|---|---|---|---|---|
| 1-10 | 1 | 0.2 | 0.5 | 5 | 0.3/0.5/1.5 |
| 50-150 | 2 | 0.5 | 1.2 | 5 | 0.5/1.0/2.0 |
| 100-300 | 3 | 0.7 | 1.75 | 10 | 0.5/1.0/2.0 |
| 200-1000 | 4 | 1.0 | 2.2 | 10/20 | 0.5/1.0/2.0 |

As described above, once smallest hydraulic diameter $dh_2$ characterizing the flow-channel system of the target reactor has been calculated, the target reactor can be manufactured using the standard reactor as an example concerning the overall principle of construction. The target reactor differs from the standard reactor basically only in the geometry of the mixing zone, based on the specific smallest hydraulic diameter; the geometry of the retention zone may be adapted. As seen from FIGS. 8A and 8B or FIG. 9, when manufacturing a target reactor starting from a standard reactor, although the basic principle of construction remains the same, not only the hydraulic diameter will change but the length of the flow-channel system may change, too. Taking account of the fact that the target volumetric flow of the target reactor is greater or smaller as compared to the standard volumetric flow of the standard reactor, other structural parameters of the flow channel system of the target reactor, such as the length, the number of windings, all other diameters except the smallest hydraulic diameter, etc. may be defined and adapted in order to establish suitable flow characteristics of the target reactor. The final outer dimensions, that is the size of the target reactor is the result of the definition and adaptation of all design features of the flow-channel system of the target reactor.

The invention claimed is:

1. A method of manufacturing a target reactor having a flow-channel system in which a plurality of reactants continuously flowing into said target reactor are mixed and interconvert to form a target volumetric flow-rate ($f_2$) of a product continuously flowing out of said target reactor, the method comprising the steps of:

determining a target volumetric flow-rate ($f_2$) of a desired product produced by a chemical reaction running within a target reactor of a plurality of reactants flowing into said target reactor;

providing a standard reactor designed to produce the same product and having the same flow-channel system as the target reactor, the standard reactor defining a standard volumetric flow-rate $f_1$ and carrying out the same interconversion as the target reactor;

determining the smallest hydraulic diameter ($d_{h1}$) of the flow-channel system of the standard reactor;

providing at least one process plate;

forming a sub-flow-channel system in said process plate; and assembling said process plate with at least one other component to form the target reactor, whereby said sub-flow-channel system of said process plate forms at least a part of a flow-channel system of the target reactor, the flow-channel system having a length and a plurality of hydraulic diameters, one of said plurality of hydraulic diameters being a smallest hydraulic diameter ($d_{h2}$) of said target reactor based on the relationship $$d_{h2} = d_{h1}\left(\frac{f_2}{f_1}\right)^{\frac{3-n}{7-n}}$$

for a turbulent or transitional turbulent flow, wherein n=0 or is a non-integer number with 1>n>0, between the corresponding smallest hydraulic diameter ($d_{h1}$) of the standard reactor having the same flow-channel system, $f_1$ is the standard volumetric flow-rate of said standard reactor carrying out the same interconversion, and $f_2$ is said target volumetric flow-rate.

2. The method according to claim 1, wherein ⅓≥n≥0.

3. The method according to claim 1, wherein $d_{h2}>d_{h1}$.

4. The method according to claim 1, wherein said target reactor is a micro-reactor, and said step of forming the sub-flow-channel system in said process plate of the target reactor comprises the step of forming at least one mixing zone having a plurality of mixing elements for mixing the plurality of reactants, said smallest hydraulic diameter ($d_{h2}$) being located in said mixing zone.

5. The method according to claim 1, wherein a plurality of process plates are provided, each of said process plates being formed with a sub-flow-channel system, and wherein said step of assembling said process plate with at least one other component comprises coupling said plurality of process plates in series, whereby said sub-flow-channel systems of said process plates are in fluid communication with each other to form the flow-channel system of the target reactor.

* * * * *